(12) United States Patent
Koral

(10) Patent No.: US 11,595,879 B2
(45) Date of Patent: Feb. 28, 2023

(54) FINE GRAINED ACCESS BARRING OF AGGRESSIVE CELLULAR DEVICES

(71) Applicant: AT&T Intellectual Property I, L.P., Atlanta, GA (US)

(72) Inventor: Yaron Koral, Cherry Hill, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 92 days.

(21) Appl. No.: 17/180,043

(22) Filed: Feb. 19, 2021

(65) Prior Publication Data

US 2022/0272609 A1 Aug. 25, 2022

(51) Int. Cl.
*H04W 48/06* (2009.01)

(52) U.S. Cl.
CPC .................................. *H04W 48/06* (2013.01)

(58) Field of Classification Search
CPC ..... H04W 28/02; H04W 28/16; H04W 36/08; H04W 36/06; H04W 36/04; H04W 48/02; H04W 76/00; H04W 72/04; H04W 48/06
See application file for complete search history.

(56) References Cited

U.S. PATENT DOCUMENTS

| 8,937,907 | B2 | 1/2015 | Ryu |
| 8,938,233 | B2 | 1/2015 | Hsu |
| 9,107,225 | B2 | 8/2015 | Lee |
| 9,210,650 | B2 | 12/2015 | Mao et al. |
| 9,253,709 | B2 | 2/2016 | Ljung |
| 9,832,782 | B2 | 11/2017 | Zhu et al. |

(Continued)

FOREIGN PATENT DOCUMENTS

| EP | 1833266 A2 | 9/2007 |
| EP | 2680656 B1 | 5/2016 |

(Continued)

OTHER PUBLICATIONS

Moon, Jihun, and Yujin Lim. "Adaptive access class barring for machine-typecommunications in LTE-A." 2016 Eighth International Conference on Ubiquitousand Future Networks (ICUFN). IEEE, 2016. https://booksc.org/dl/60303333/eaecd2.

(Continued)

*Primary Examiner* — Dung Hong

(74) *Attorney, Agent, or Firm* — Amin, Turocy & Watson, LLP

(57) ABSTRACT

Fine grained access barring of aggressive cellular devices is provided. A method can include detecting, by a system comprising a processor, a frequency of signaling events transmitted by network equipment operating as part of a communication network; in response to the frequency of the signaling events transmitted by the network equipment being determined to be greater than a frequency threshold, altering, by the system, an access class of the network equipment from a first access class to a second access class that is different from the first access class, wherein the second access class is reserved via the communication network; and in response to the access class of the network equipment being altered to the second access class, causing, by the system, a base station serving the network equipment to deny at least a portion of network access requests transmitted by the network equipment to the base station.

20 Claims, 11 Drawing Sheets

(56) References Cited

U.S. PATENT DOCUMENTS

| | | | |
|---|---|---|---|
| 9,854,510 B2 | 12/2017 | Pasupuleti et al. | |
| 10,701,618 B2 | 6/2020 | Tenny et al. | |
| 2004/0209623 A1 | 10/2004 | Sauter et al. | |
| 2010/0042734 A1* | 2/2010 | Olafsson | H04W 4/02 709/229 |
| 2011/0199905 A1 | 8/2011 | Pinheiro et al. | |
| 2011/0201307 A1* | 8/2011 | Segura | H04W 48/02 455/411 |
| 2014/0370890 A1* | 12/2014 | Huang | H04W 48/10 455/434 |
| 2016/0302135 A1 | 10/2016 | Yang et al. | |
| 2018/0124680 A1* | 5/2018 | Dhanda | H04W 48/06 |
| 2020/0220946 A1* | 7/2020 | Chan | H04W 76/18 |
| 2020/0275344 A1* | 8/2020 | Byun | H04W 74/0833 |
| 2022/0104064 A1* | 3/2022 | Kamat | H04W 28/0284 |

FOREIGN PATENT DOCUMENTS

| | | | | |
|---|---|---|---|---|
| EP | 2939458 B1 | 2/2018 | | |
| WO | WO-2009099356 A1 * | 8/2009 | | H04W 48/02 |
| WO | WO-2016154903 A1 * | 10/2016 | | H04W 74/00 |
| WO | 2017217963 A1 | 12/2017 | | |
| WO | 2019136880 A1 | 7/2019 | | |
| WO | 2020112606 A1 | 6/2020 | | |

OTHER PUBLICATIONS

Tello-Oquendo, Luis, et al. "Reinforcement learning-based ACB in LTE-Anetworks for handling massive M2M and H2H communications." 2018 IEEEInternational Conference on Communications (ICC). IEEE, 2018. http://personales.upv.es/~jmartine/Publications/ICC18.pdf.

Taleb, Tarik, and Adlen Ksentini. "An efficient scheme for MTC overload controlbased on signaling message compression." 2013 IEEE Global CommunicationsConference (GLOBECOM). IEEE, 2013. http://mosaic-lab.org/uploads/papers/96852cc9-36be-441c-9d55-9ee30a52c270.pdf.

Duan, Suyang, Vahid Shah-Mansouri, and Vincent WS Wong. "Dynamic accessclass barring for M2M communications in LTE networks." 2013 IEEE GlobalCommunications Conference (GLOBECOM). IEEE, 2013. http://www.ece.ubc.ca/~vincentw/C/DSWcGC13.pdf.

He, Hongliang, et al. "Traffic-aware ACB scheme for massive access in machine-to-machine networks." 2015 IEEE International conference on communications(ICC). IEEE, 2015. https://booksc.org/dl/45982350/20b05f.

* cited by examiner

FINE GRAINED ACCESS BARRING OF AGGRESSIVE CELLULAR DEVICES

TECHNICAL FIELD

The present disclosure relates to wireless communication systems, and, in particular, to techniques for access control in a wireless communication system.

BACKGROUND

Advancements in mobility network technology, such as the introduction of Fifth Generation (5G) wireless networks, have enabled support for an increasing number of devices as well as an increasing variety of device types. As the number and variety of devices utilizing a network increases, the probability that one or more network devices may act aggressively toward the network, e.g., due to bugs or faults in the hardware, software, and/or configuration of the devices, can similarly increase. By way of example, a faulty device can initiate a large number of signaling events that may overload the network. Additionally, these faults could be exploited by malicious users to create the effect of a distributed denial of service (DDoS) attack on the network and/or otherwise disrupt normal network service.

DETAILED DESCRIPTION

Figure 1:
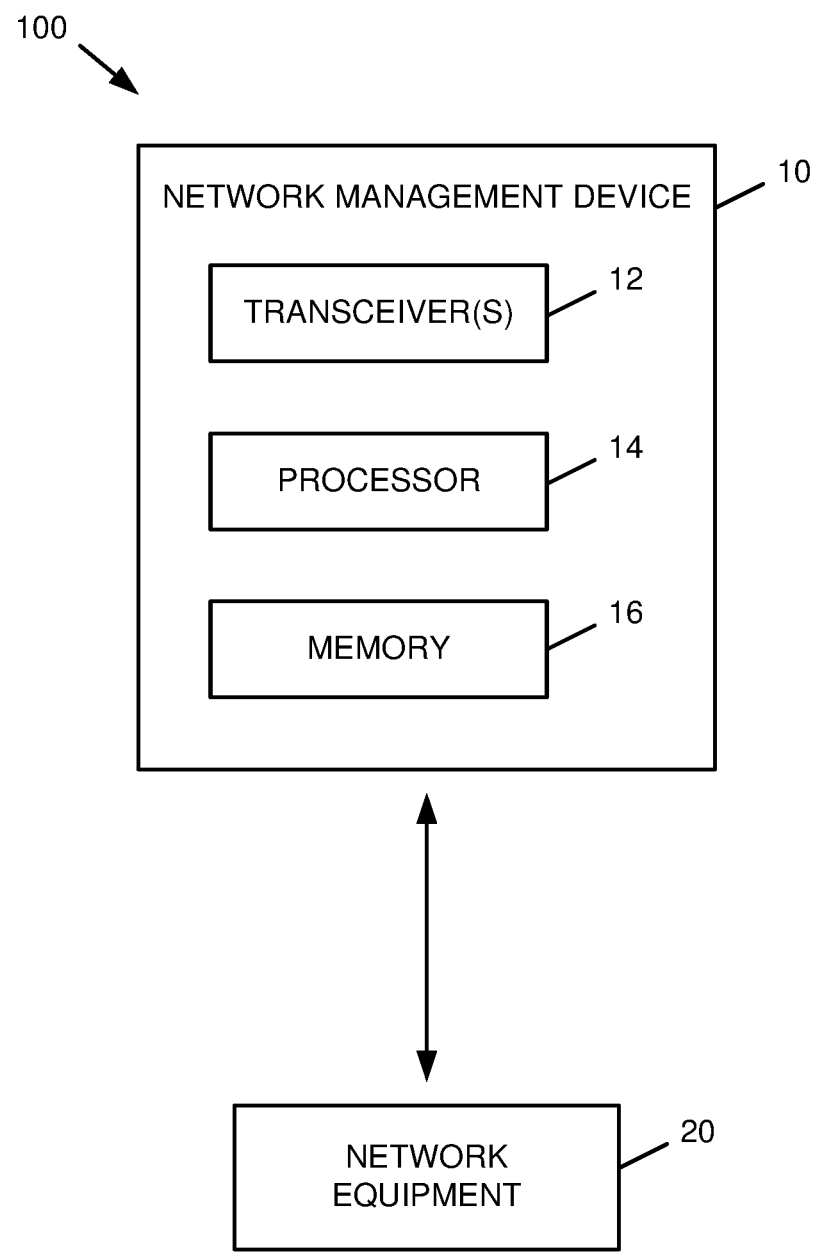
FIG. 1 is a block diagram of a system that facilitates fine grained access barring of aggressive cellular devices in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include detecting, by a system including a processor, a frequency of signaling events transmitted by network equipment operating as part of a communication network. In response to the frequency of the signaling events transmitted by the network equipment being determined to be greater than a frequency threshold, the method can include altering, by the system, an access class of the network equipment from a first access class to a second access class that is different from the first access class, where the second access class is reserved via the communication network. Further in response to the access class of the network equipment being altered to the second access class, the method can include causing, by the system, a base station serving the network equipment to deny at least a portion of network access requests transmitted by the network equipment to the base station.

In another aspect, a system as described herein can include a processor and a memory that stores executable instructions that, when executed by the processor, facilitate performance of operations. The operations can include determining a frequency of signaling events transmitted from a user equipment to a base station in a communication network; sending an instruction to change an access class of the user equipment from being associated with a first access class to being associated with a second access class, distinct from the first access class, in response to the frequency of the signaling events received from the user equipment being determined to be greater than a frequency threshold, wherein the second access class is reserved by network equipment in the communication network; and causing the base station to deny at least a portion of access requests conveyed by the user equipment in response to the user equipment being associated with the second access class.

In a further aspect, a non-transitory machine-readable medium as described herein can include executable instructions that, when executed by a processor, facilitate performance of operations. The operations can include identifying a signaling frequency associated with a network device served by a base station associated with a communication network; replacing a first access class associated with the network device with a second access class that is different from the first access class based on the signaling frequency associated with the network device being greater than a threshold, wherein the second access class is reserved via the communication network; and causing the base station to deny a network access request transmitted by the network device to the base station based on the network device being associated with the second access class.

Referring first to FIG. 1, a system 100 that facilitates fine grained access barring of aggressive cellular devices is illustrated. System 100 as shown by FIG. 1 includes a network management device 10 that can communicate with network equipment 20, e.g., one or more mobile devices. In an aspect, the network management device 10 can be implemented by one or more network controllers and/or other devices, e.g., devices associated with a radio access network (RAN), that manage communication between devices of an underlying wireless communication network. The network management device 10, when implemented in this manner, can reside on the same communication network as the network equipment 20 or on a different network (e.g., such that the controller can communicate with respective network devices via a separate system). Also or alternatively, the network management device 10 can in some cases be implemented via a base station, an access point, an Evolved Node B (eNB), a next generation Node B (gNB), and/or another device that provides communication service to the network equipment 20. Other implementations of the network management device 10 are also possible. While various aspects described herein include examples in which the network management device 10 is implemented separately from respective base stations, access points, eNBs, gNBs, etc., it should be appreciated that some or all of the functionality of the network management device 10 in these examples could be implemented by the base stations, access points, eNBs, gNBs etc., in addition to or in place of a separate network management device 10.

In an aspect, the network equipment 20 can include any suitable device(s) that can communicate over a wireless communication network associated with the network management device 10. Such devices can include, but are not limited to, cellular phones, computing devices such as tablet or laptop computers, autonomous vehicles, Internet of Things (IoT) devices, etc. Also or alternatively, network equipment 20 could include a device such as a modem, a mobile hotspot, or the like, that provides network connectivity to another device (e.g., a laptop or desktop computer, etc.) which itself can be fixed or mobile.

Collectively, the network management device 10 and the network equipment 20 can form at least a portion of a wireless communication network. While only one network management device 10 and one network equipment 20 are illustrated in FIG. 1 for simplicity of illustration, it should be appreciated that a wireless communication network can include any amount of network equipment 20 and/or other devices, such as the network management device 10, base stations, etc.

The network management device 10 shown in system 100 can include one or more transceivers 12 that can communicate with (e.g., transmit messages to and/or receive messages from) the network equipment 20 and/or other devices in system 100. The transceiver 12 can include respective antennas and/or any other hardware or software components (e.g., an encoder/decoder, modulator/demodulator, etc.) that can be utilized to process signals for transmission and/or reception by the network management device 10 and/or associated network devices such as a base station.

In an aspect, the network management device 10 can further include a processor 14 and a memory 16, which can be utilized to facilitate various functions of the network management device 10. For instance, the memory 16 can include a non-transitory computer readable medium that contains computer executable instructions, and the processor 14 can execute instructions stored by the memory 16. For simplicity of explanation, various actions that can be performed via the processor 14 and the memory 16 of the network management device 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable.

In an aspect, the processor 14 and memory 16 can be utilized to detect aggressive network equipment 20 and take appropriate actions to mitigate the impact of such devices on an associated communication network. As used herein, an "aggressive" device refers to a device that initiates an abnormally high amount of signaling events, such as network attach requests or the like, relative to the network in which the device operates. For instance, an aggressive device may engage in a signaling storm, which is a burst of signaling events of a high quantity and/or frequency that can potentially impact communication service to other network equipment due to network overloading. Techniques for classifying a device as aggressive based on a signaling threshold are described in further detail below with respect to, e.g., FIGS. 5 and 8.

By implementing various embodiments as described herein, various advantages can be realized that can improve the performance of a wireless communication network and/or respective devices in the network. These advantages can include, but are not limited to, the following. Network bandwidth usage efficiency in an area can be increased. Communication network overloading caused by malfunctioning and/or malicious devices can be reduced, resulting in improved network connectivity. Additionally, network access can be limited for aggressive network devices with limited to no impact on non-aggressive devices. Other advantages are also possible.

Figure 2:
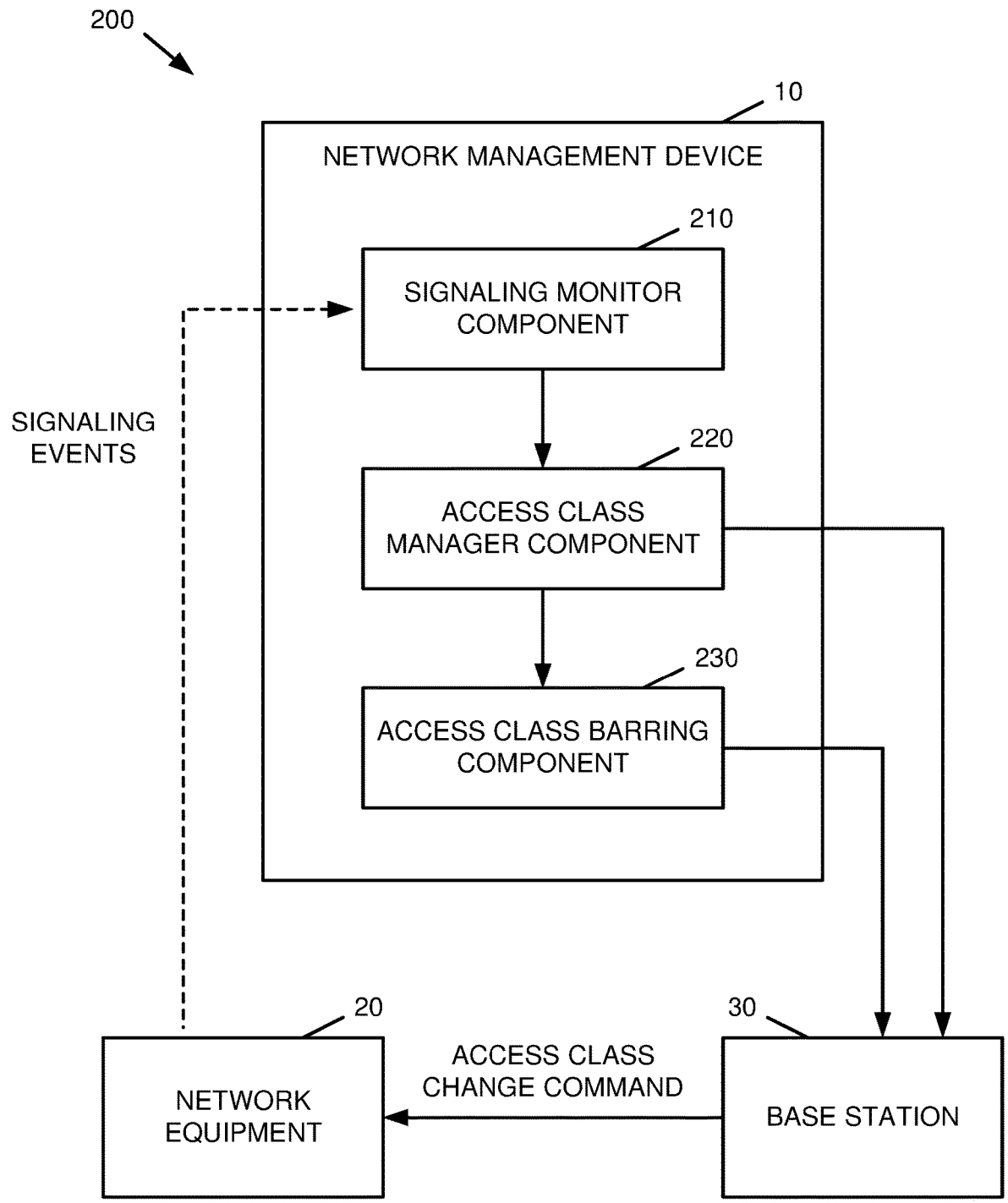
FIG. 2 is a block diagram that depicts the functionality of the network management device of FIG. 1 in further detail in accordance with various aspects described herein.

With reference now to FIG. 2, a block diagram of a system 200 that facilitates fine grained access barring of aggressive cellular devices in accordance with various aspects described herein is illustrated. Repetitive description of like elements employed in other embodiments described herein is omitted for sake of brevity. System 200 as shown in FIG. 2 includes a network management device 10 that can operate in a similar manner to that described above with respect to FIG. 1. As further shown in FIG. 2, the network management device 10 can communicate with network equipment 20 (network devices, user equipment devices, etc.), either directly or indirectly via one or more base stations 30 (access points, eNBs, etc.), via one or more communication networks.

In an aspect, the network equipment 20 can maintain connectivity to a network managed by the network management device 10 by exchanging signaling messages for events such as attaching to the network, changing location, initiating a data session, waking up from idle mode, and/or other suitable events. The network, in turn, can be designed to support a given volume of these signaling events, which in a typical network is significantly smaller than the volume of user data passing through the network. While network standards exist to regulate the maximum number of signaling messages a device can generate at any given time, network equipment 20 in some cases can violate these regulations, e.g., due to hardware, software or configuration faults and/or due to other causes. Furthermore, some of these faults could potentially be exploited or reproduced by attackers or other malicious users, e.g., to cause network outages by initiating a signaling storm via a compromised device and/or otherwise further increasing the volume of signaling messages in the network. This potential for network service disruption is of particular concern for IoT devices, which are generally less secure and/or more prone to malfunction than other network-connected devices.

To mitigate the risk of network service disruption described above, the network management device 10 shown in system 200 can utilize improved Access Class Barring (ACB) techniques that are adapted to protect the network against specific aggressive devices. By utilizing the techniques described herein, the network management device 10 can partially or completely bar access by an aggressive device to the network via ACB without denying service from other, benign or otherwise non-aggressive devices.

As shown in FIG. 2, the network management device 10 of system 200 can include a signaling monitor component 210 that can detect a frequency of signaling events, such as network attach requests and/or other signaling that is desirably tracked by the network management device 10, that are transmitted by network equipment 20 operating as part of a communication network.

The network management device 10 shown in system 200 further includes an access class manager component 220 that, in response to determining that the frequency of the signaling events transmitted by the network equipment 20 is greater than a defined threshold, can alter an access class of the network equipment 20 from a first access class to a second, different access class. As shown by system 200, the access class manager component 220 can alter the access class of the network equipment 20 by instructing a base station 30 serving the network equipment 20 to issue an access class change command to the network equipment 20, e.g., via an over-the-air (OTA) message and/or by other suitable means.

In an aspect, the first access class can correspond to an access class originally assigned to the network equipment 20 and recorded on a Subscriber Information Module (SIM) card of the network equipment 20 and/or other storage at the network equipment 20. Additionally, the second access class can be reserved by the communication network, e.g., for operator-controlled devices on the network and/or other defined special device classes. By way of example, the first access class of the network equipment 20 can be an access class from a range from 0 to 9, and the second access class can be an access class of 11 or 15. In this example, access classes 10 and 12-14 can remain unused due to their association with non-operator uses such as Enhanced 911 (E911) communications and the like. Other access class assignment schemes could also be used.

The network management device 10 of system 200 additionally includes an access class barring component 130 that, in response to the access class of the network equipment 20 being altered from the first access class to the second access class, causes the base station 30 serving the network equipment 20 to deny at least a portion of network access (attach) requests transmitted by the network equipment 20 to the base station 30. In an aspect, the access class barring component 230 can cause the base station 30 to deny network access/attach requests using one or more ACB techniques known in the art and/or by one or more specialized techniques. An example of a technique that can be utilized by the access class barring component 230 to restrict network access to aggressive devices is described in further detail below with respect to FIG. 9.

As further shown by FIG. 2, the access class manager component 220 and access class barring component 230 of the network management device 10 can communicate with a serving base station 30 for given network equipment 20, e.g., via a backhaul link between the network management device 10 and the base station 30 and/or by any other suitable wired or wireless communication techniques. Alternatively, in an implementation in which the network management device 10 is implemented via the base station 30, the access class manager component 220 and the access class barring component 230 could control network access by the network equipment 20 directly, e.g., via a processor 14 and memory 16 (not shown in FIG. 2) associated with the base station 30, without engaging in inter-device signaling. Other implementations could also be used.

Figure 3:
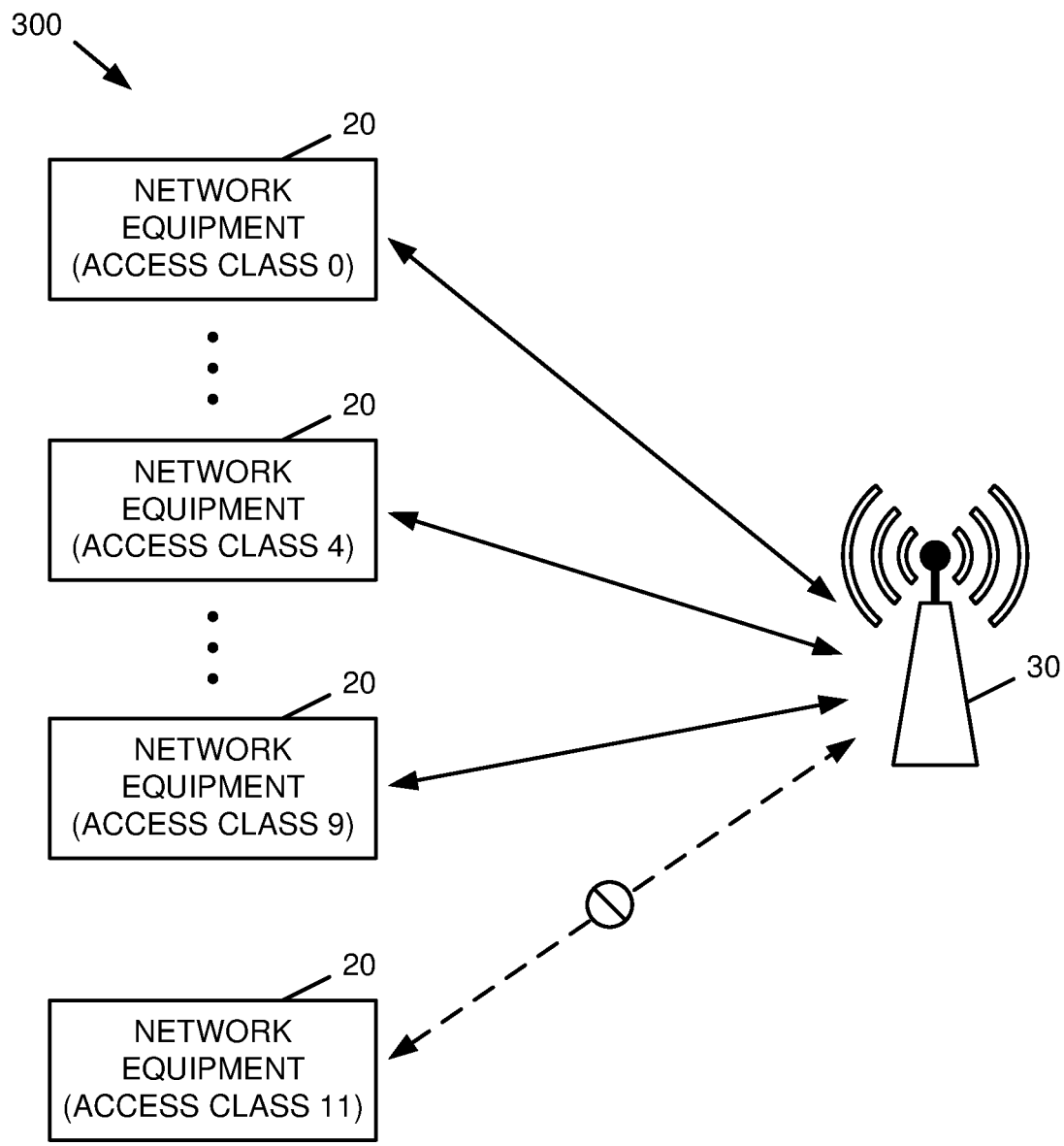
FIG. 3 is a diagram that illustrates example access class barring functions that can be performed in accordance with various aspects described herein.

Turning now to FIG. 3, diagram 300 illustrates example ACB functions that can be performed by a base station in accordance with various aspects described herein. As shown in diagram 300, all network equipment 20 associated with a given network can be assigned to one or more access classes out of a base group of 10 classes, e.g., access classes 0-9. In an aspect, classes 0-9 are assigned arbitrarily, e.g., based on the value at a defined digit position within the International Mobile Equipment Identity (IMEI) assigned to a given device and/or by other means, and stored on the SIM card of the corresponding device. Subsequently, a network operator can activate ACB, thereby limiting some or all operations of devices from one or more given access classes. For instance, devices belonging to a barred access class can have a given probability to be barred from performing actions. In the event that a device is barred from performing an action via ACB, the device can also be given an amount of time to wait before a subsequent attempt. However, this technique results in the barring of an entire class of devices, which can include approximately 10% of all subscriber devices due to the nature of access class assignment.

Also or alternatively, the network can utilize Extended Access Barring (EAB), which enables a carrier to mark devices that are not considered high priority with EAB. Subsequently, in the case of a disaster or other emergency, the carrier can bar access from some or all devices to which EAB has been applied. Similarly, however, this technique applies access barring to all devices deemed low priority, and not specifically to devices causing a signaling storm.

In contrast, diagram 300 depicts an example in which ACB can be applied only to a set of aggressive devices while leaving the remainder of the devices in the network uninterrupted. As shown in diagram 300, a communication system can utilize an access class that is generally reserved for operator use, here access class 11, to temporarily replace the access class of aggressive devices with the reserved access class. Subsequently, ACB can be activated dynamically on one or more base stations 30 where aggressive devices, e.g., devices associated with the reserved access class, are connected. As further shown by diagram 300, the base station 30 can activate ACB for the reserved access class (e.g., access class 11) without impacting other network equipment 20 operating in the system, thereby reducing or eliminating the impact of ACB as applied in this manner on non-aggressive network devices.

In an aspect, because access class 11 is reserved for operator use in the network, various techniques can be employed to exempt base stations 30 and/or other devices that are normally associated with that access class and/or otherwise mitigate the effects of ACB with respect to those devices. For instance, a communication network can maintain a listing of base stations 30 and/or other network-controlled devices that are assigned to access class 11 and exempt these devices from signaling restrictions imposed by ACB. Alternatively, the network can assign a comparatively small initial processing delay (e.g., a processing delay on the order of seconds) for devices assigned to access class 11 during active barring that increases with subsequent signaling attempts (e.g., to a processing delay on the order of several minutes). In doing so, the processing delay associated with base stations 30 and/or other normally functioning devices assigned to access class 11 can increase more slowly than the processing delays associated with aggressive devices due to the smaller number of signaling events initiated by the normally functioning devices. Other techniques could also be used.

Figure 4:
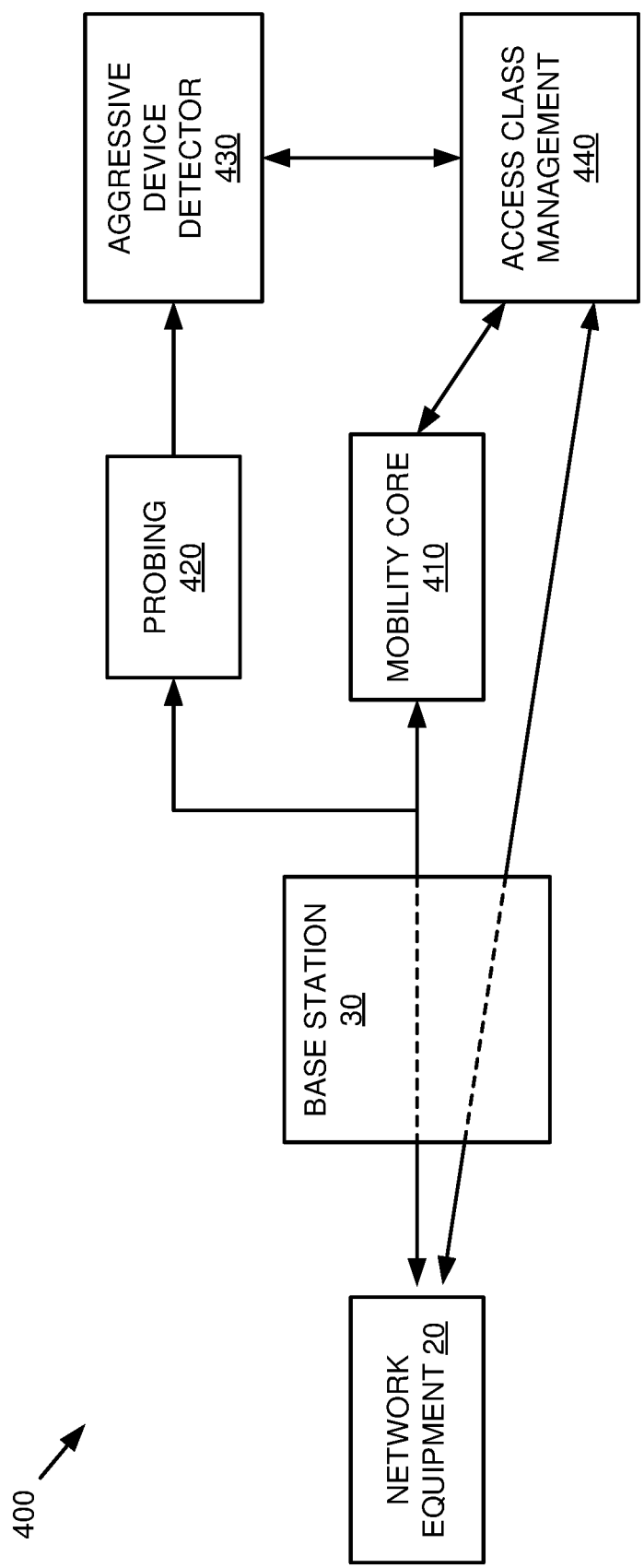
FIG. 4 is a block diagram of a system that facilitates access barring of aggressive cellular devices in a wireless communication network in accordance with various aspects described herein.

With reference next to FIG. 4, a block diagram of a system 400 that facilitates access barring of aggressive cellular devices in a wireless communication network in accordance with various aspects described herein is illustrated. Repetitive description of like elements employed in other embodiments described herein is omitted for sake of brevity. As shown in system 400, network equipment 20 (e.g., one or more network devices, etc.) can access a communication network via a base station 30 (access point, eNB, gNB, etc.) that provides communication coverage for the network equipment 20. For instance, as shown in FIG. 4, a base station 30 can relay signaling messages between the network equipment 20 and a mobility core 410 to facilitate the use of various network functions by the network equipment 20.

In an aspect, the mobility core 410 can facilitate operations within the communication network such as authentication, policy management, service management, location/mobility management, etc. Additionally, the mobility core 410 can facilitate routing communications within the network, such as by facilitating connections between different parties, between network equipment 20 and a destination server associated with given data traffic, and the like. In another aspect, the mobility core 410 can facilitate identification of a given mobile device from its associated permanent identifiers (e.g., an IMEI or an International Mobile Subscriber Identity (IMSI)), which can be inaccessible to an associated radio access network (RAN), e.g., a RAN associated with the base station 30, due to security reasons.

In addition, the mobility core 410 can manage a secure connection with network equipment 20, thereby enabling the mobility core 410 to decrypt connection data corresponding to network equipment and an associated base station 30. This can, in turn, enable improved decision making regarding whether to bar access to a device, e.g., as described in more detail herein. Further, the mobility core 410 can facilitate network visibility on a regional scale, thereby facilitating more robust access control decisions as compared to the base station 30 and/or other RAN elements that operate on a local level.

As further shown by system 400, signaling messages sent by network equipment to the mobility core 410 via the base station 30 can be detected by a probing module 420 associated with the communication network. In one embodiment, the probing module 420 can be a network packet analyzer or other suitable module that identifies signaling messages sent by a given network equipment 20 and their frequency, e.g., in a similar manner to that described above with respect to the signaling monitor component 210 of the network management device 10. Information collected by the probing module 420 can be provided to an aggressive device detector, which can further coordinate with an access class management module 440 as further shown in system 400. In an aspect, the aggressive device detector 430 and the access class management module 440 can collectively operate in a similar manner to the access class manager component 220 and the access class barring component 230 of network management device 10, e.g., to provide improved ACB functionality for the network.

In an aspect, the aggressive device detector 430 can receive respective signaling events detected by the probing module 420 as input. From this input, the aggressive device detector 430 can track the volume of messages generated by respective network equipment 20 and determine whether any device of the network equipment exceeds a signaling frequency threshold, e.g., a threshold t. In the event that any device of the network equipment 20 exceeds this threshold, the aggressive device detector 430 can coordinate with the access class management module 440 to restrict the ability of those devices to send signaling events within the network. For instance, the access class management module 440 can provide instructions to the mobility core 410 to initiate ACB for one or more base stations 30 in the network. Further, the access class management module 440 can instruct one or more base stations 30 to alter the access class of network equipment 20 found to be acting aggressively, e.g., via an OTA message from the base station 30 to the desired network equipment 20. Operation of the aggressive device detector 430 and the access class management module 440 are described in further detail below with respect to FIG. 5 and FIG. 6, respectively.

Figure 5:
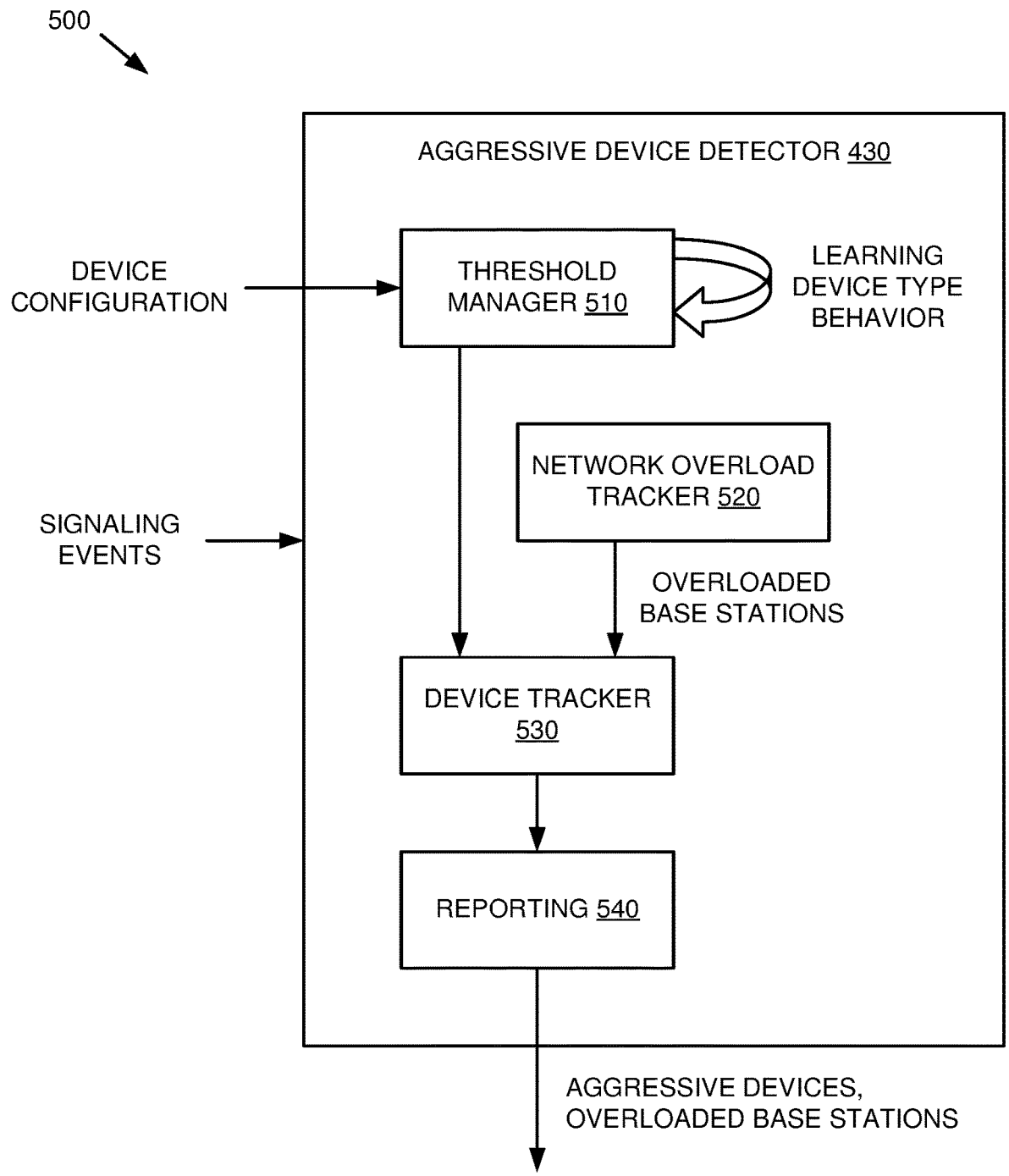
FIG. 5 is a block diagram that depicts the aggressive device detector of FIG. 4 in further detail in accordance with various aspects described herein.

Referring now to FIG. 5, diagram 500 illustrates the operation of the aggressive device detector 430 shown in FIG. 4 in further detail. As noted above, the aggressive device detector 430 can receive input signaling events from a probing module 420 as input, and track the volume of messages generated by respective network equipment 20 to determine whether any devices of the network equipment 20 exceed a given threshold t.

In an aspect, the threshold utilized by the aggressive device detector 430 can be set according to values derived from applicable network standards, such as Third Generation Partnership Project (3GPP) standards or the like. For instance, the threshold can be initially set based on a determination that a device should not attach to the network more than 5 times in a minute.

As further shown in diagram 500, the aggressive device detector 430 can include a threshold manager 510 that can adjust a given signaling frequency threshold for certain types of devices based on special requirements associated with those types of devices, past device behavior, and/or other factors. In an aspect, the threshold manager 510 can maintain separate thresholds for different subsets of devices. These thresholds can be determined by manual configuration (e.g., by a network operator), by utilizing machine learning techniques to learn typical behavior of given device types during times where the network is not overloaded, and/or by other means. By way of example, a threshold assigned to network-connected automobiles can be higher than that assigned to other device classes due to safety considerations associated with denying service to a connected automobile for extended periods of time. In an aspect, the threshold manager 510 can provide respective determined thresholds to a device tracker 530, as will be discussed below.

The aggressive device detector 430 shown in diagram 500 further includes a network overload tracker 520 that can determine whether overloading is present in some or all of the underlying network. In an aspect, the access class management module 440 shown in system 400 can facilitate barring of aggressive devices in cases of overall network overloading, e.g., and refrain from barring devices in other conditions. Accordingly, the network overload tracker 520 can determine whether sufficient overload in the network exists to initiate access barring. If such overload is detected, the network overload tracker 520 can alert the device tracker 530 to begin tracking aggressive devices. Additionally, the network overload tracker 520 can provide a listing of base stations affected by aggressive devices to the device tracker 530 to enable setting ACB only at base stations where such activity is desirable.

The device tracker 530 shown in diagram 500 can monitor the affected base stations from the listing provided by the network overload tracker 520 and create a list of devices that exceed the signaling rate threshold determined by the threshold manager 510. Information relating to this list can be provided, e.g., in real time or near real time, to a reporting module 540, which can facilitate the transferal of regular reports to the access class management module 440, e.g., at regular intervals. In an aspect, various areas or other portions of a network can be exempted from ACB, e.g., by a network operator or other entity, by configuring these exemptions at the reporting module 540.

Figure 6:
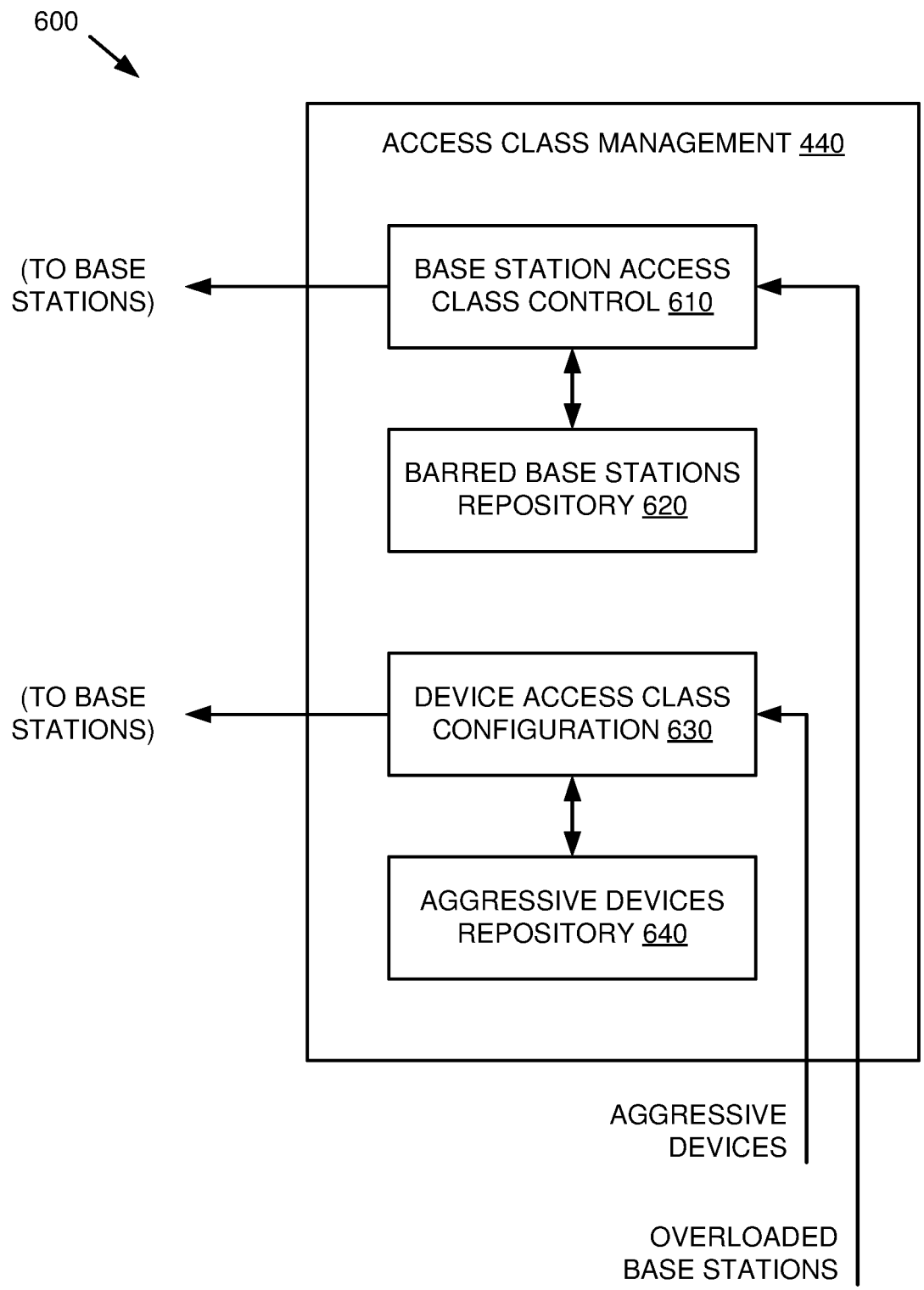
FIG. 6 is a block diagram that depicts the access class management of FIG. 4 in further detail in accordance with various aspects described herein.

Referring next to FIG. 6, diagram 600 illustrates the operation of the access class management module 440 shown in FIG. 4 in further detail. As shown in diagram 600, the access class management module 440 can include a base station access class control module 610, which can communicate with a barred base stations repository 620, as well as a device access class configuration module 630 that can communicate with an aggressive devices repository 640.

In an aspect, the base station access class control module 610 can accept a listing of overloaded base stations as input, e.g., from the network overload tracker 520 of the aggressive device detector 430, and coordinate activating ACB on affected base stations. By limiting ACB to only overloaded base stations as identified by the aggressive device detector 430, base stations at which no overloading is present can continue to function normally, thereby reducing the impact of ACB on base stations that are not overloaded.

As further shown in diagram 600, the base station access class control module 610 can maintain records corresponding to the base station(s) at which ACB is activated via the barred base stations repository 620. In addition, the base station access class control module 610 can set respective properties that can be utilized by the affected base stations in administering ACB, such as the time respective devices are to be barred (e.g., for how long each respective device is to wait before attempting new signaling), the factor of barring (e.g., the probability that a given device's signaling attempt will be barred), etc. Further, if only specific services (e.g., less than all services) are subject to ACB, the base station access class control module 610 can also control which specific services are to be barred by a given base station.

The base station access class control module 610 can also determine a time interval for which ACB is to be active at a given base station and to clear ACB at that base station upon expiration of the time interval. Once ACB has been deactivated at a base station, that base station can also be removed from the barred base stations repository 620.

In addition to maintaining a current record of the base stations for which ACB is currently active, the barred base stations repository 620 can further store historical data relating to base stations for which ACB has been activated, as well as the time(s) and manner(s) in which ACB was activated for each affected base station. This historical data could then subsequently be used for purposes such as network usage pattern detection, network performance improvement, and/or other desirable ends.

As additionally shown in diagram 600, the device access class configuration module 630 can direct the transmission of access class change commands to respective aggressive network equipment, e.g., via OTA messages sent to the network equipment by serving base station(s) for that network equipment. As described above, an access class change command can cause an aggressive network device to alter its access class from an original access class to a reserved access class (e.g., access class 11). In an aspect, a network device can respond to receiving an access class change command by removing its original access class and replacing that access class with a new access class as provided in the command.

In addition, the device access class configuration module 630 can store the originally allocated access class for a given device in an aggressive devices repository 640, e.g., along with the IMEI of the device and/or other identifying information for the device. Subsequently (e.g., after passive of a predetermined amount of time, in response to the signaling frequency of a device falling below a defined threshold, etc.), the device access class configuration module 630 can restore the original access class of a device by fetching the original access class of the device and issuing a second access class change command, e.g., by instructing a serving base station for the device to provide a second OTA message to the device that re-adds its original access class and clears the reserved access class.

In a similar manner to the barred base stations repository 620, the aggressive devices repository 640 can further be used to maintain historical data relating to network equipment deemed to be aggressive as well as actions taken to control access by that network equipment to the network. This historical data can then be utilized for overall performance improvement as well as to tune signaling frequency thresholds for specific types and/or classes of devices.

Figure 7:
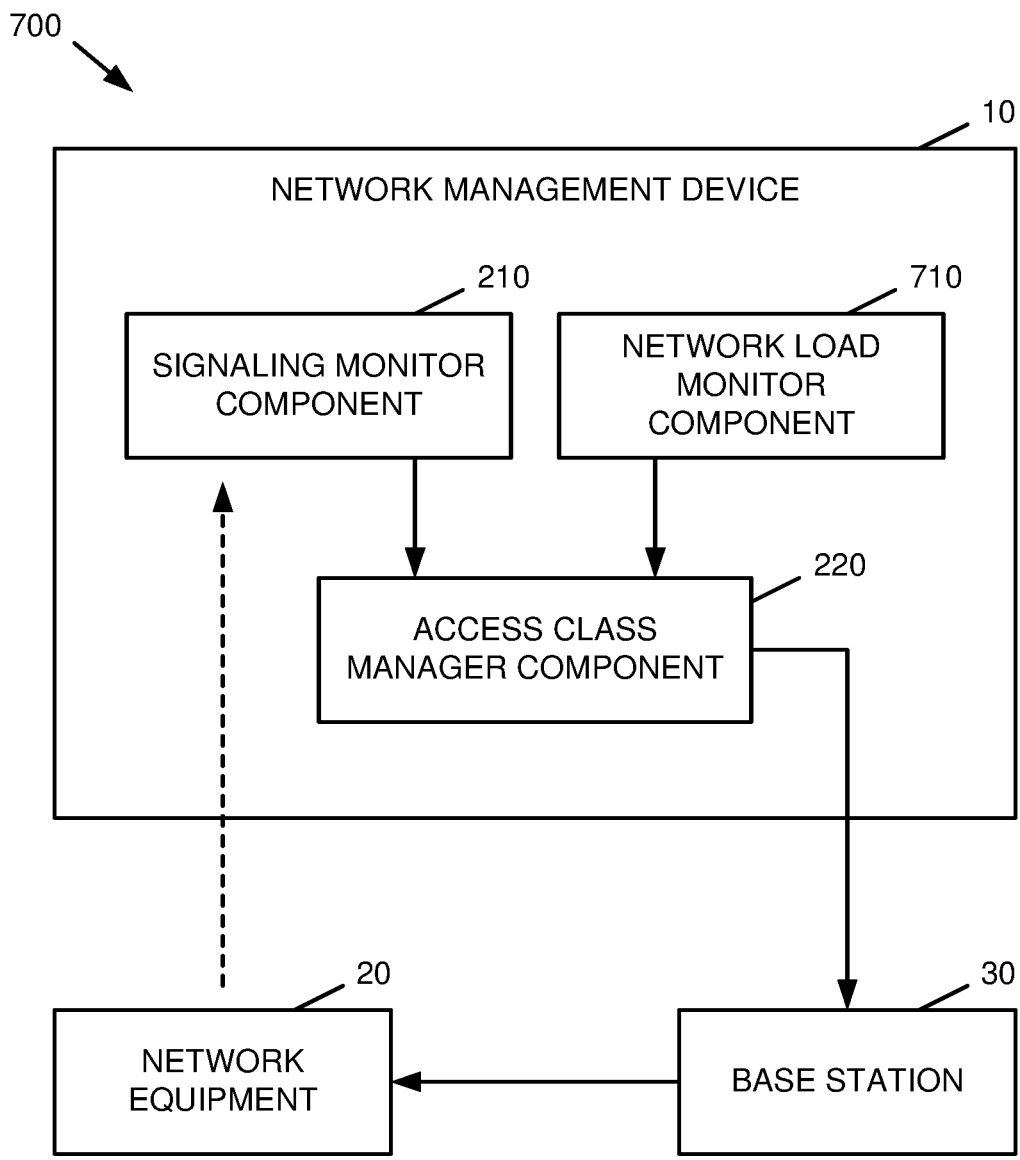
FIG. 7 is a block diagram of a system that facilitates adjustment of access class barring based on network load in accordance with various aspects described herein.

With reference now to FIG. 7, a block diagram of a system 700 that facilitates adjustment of access class barring based on network load in accordance with various aspects described herein is illustrated. Repetitive description of like elements employed in other embodiments described herein is omitted for sake of brevity. As shown by FIG. 7, system 700 includes a network load monitor component 710 that can monitor the load level of a base station 30 serving given network equipment 20. In response to the load level of the base station 30 being above a loading threshold, the network load monitor component 710 can instruct the access class manager component 220 to initiate ACB at the base station 30 as described above.

In an aspect, the network load monitor component 710 can function similarly to the network overload tracker 520 described above with respect to FIG. 5 to generate a list of base stations exceeding a given loading threshold. The loading threshold utilized by the network load monitor component 710 can be a uniform threshold, or alternatively the threshold can be assigned for individual base stations 30 based on factors such as the area in which a base station 30 operates, an expected load level of the base station 30 (e.g., based on network usage patterns, a number of devices connected to the base station 30, etc.), the time of day, the current day of the week or year, the technical capabilities of the base station 30, or other factors. As noted above, by restricting ACB to base stations 30 experiencing overloading, access control can be performed without impacting base stations that are experiencing normal load conditions.

In another aspect, the network load monitor component 710 can adjust a load threshold for triggering ACB at a given base station 30 based on a number of aggressive devices determined to be served by the base station in proportion to an overall number of devices served by the base station. Thus, for instance, the number of aggressive devices that cause a base station 30 in a metropolitan area, a transit hub, or other high-volume locations could be higher than that associated with another base station 30 in a location associated with less network traffic.

Figure 8:
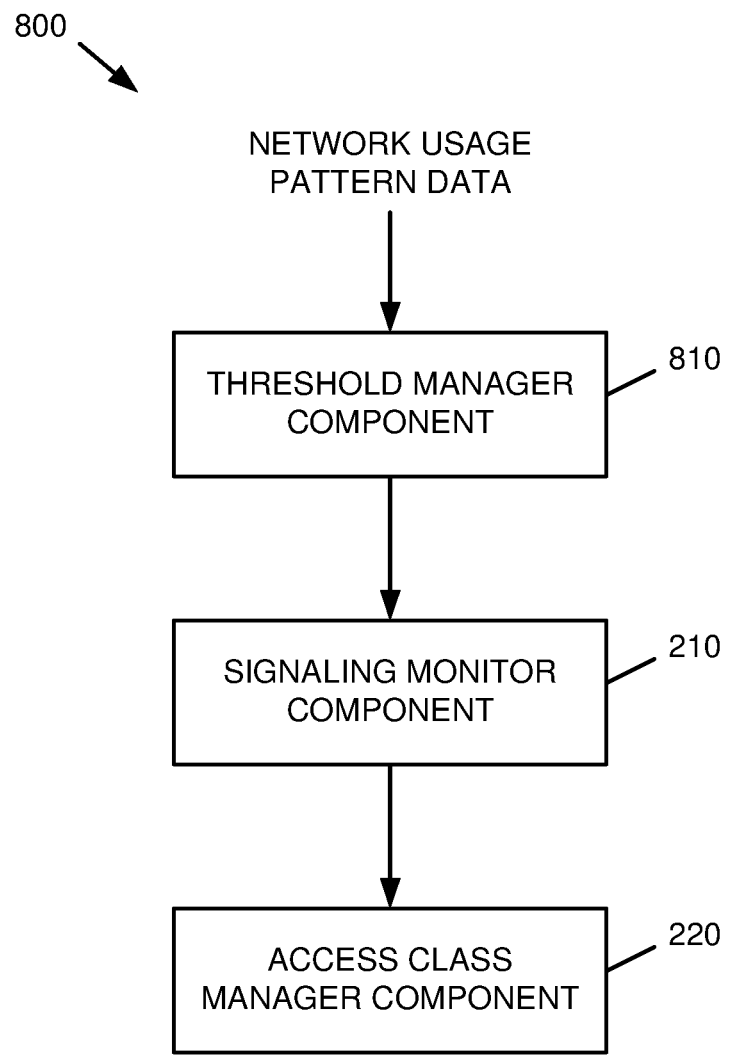
FIG. 8 is a block diagram of a system that facilitates adjustment of access class barring based on network usage patterns in accordance with various aspects described herein.

Turning next to FIG. 8, a block diagram of a system 800 that facilitates adjustment of access class barring based on network usage patterns in accordance with various aspects described herein is illustrated. Repetitive description of like elements employed in other embodiments described herein is omitted for sake of brevity. System 800 as shown in FIG. 8 includes a threshold manager component 810, which can determine pattern data representative of a network usage pattern associated with a base station serving given network equipment and set a frequency threshold (e.g., a frequency threshold as used by the signaling monitor component 210) based on the network usage pattern.

In an aspect, the threshold manager component 810 can set frequency thresholds for respective base stations 30 on a per-base station basis. For instance, a threshold set by the threshold manager component 810 for a given base station 30 can further be based on a number of aggressive devices reported to be operating in the coverage area of the base station, e.g., by the reporting module 540 described above with respect to FIG. 5 and/or by other means. By way of example, a frequency threshold for activating ACB at a given base station 30 can be decreased by the threshold manager component 810 in response to an increase in the overall number of aggressive devices served by the base station 30.

In another aspect, a signaling frequency threshold as assigned by the threshold manager component 810 for a given base station 30 can be based on expected signaling activity by devices served by that base station 30. For instance, a base station 30 that serves an airport or other major transit center can be configured with a frequency threshold that is more lenient than that associated with other base stations 30 because of expected signaling bursts associated with user devices arriving at and/or departing from the transit center. Other similar examples are also possible.

Figure 9:
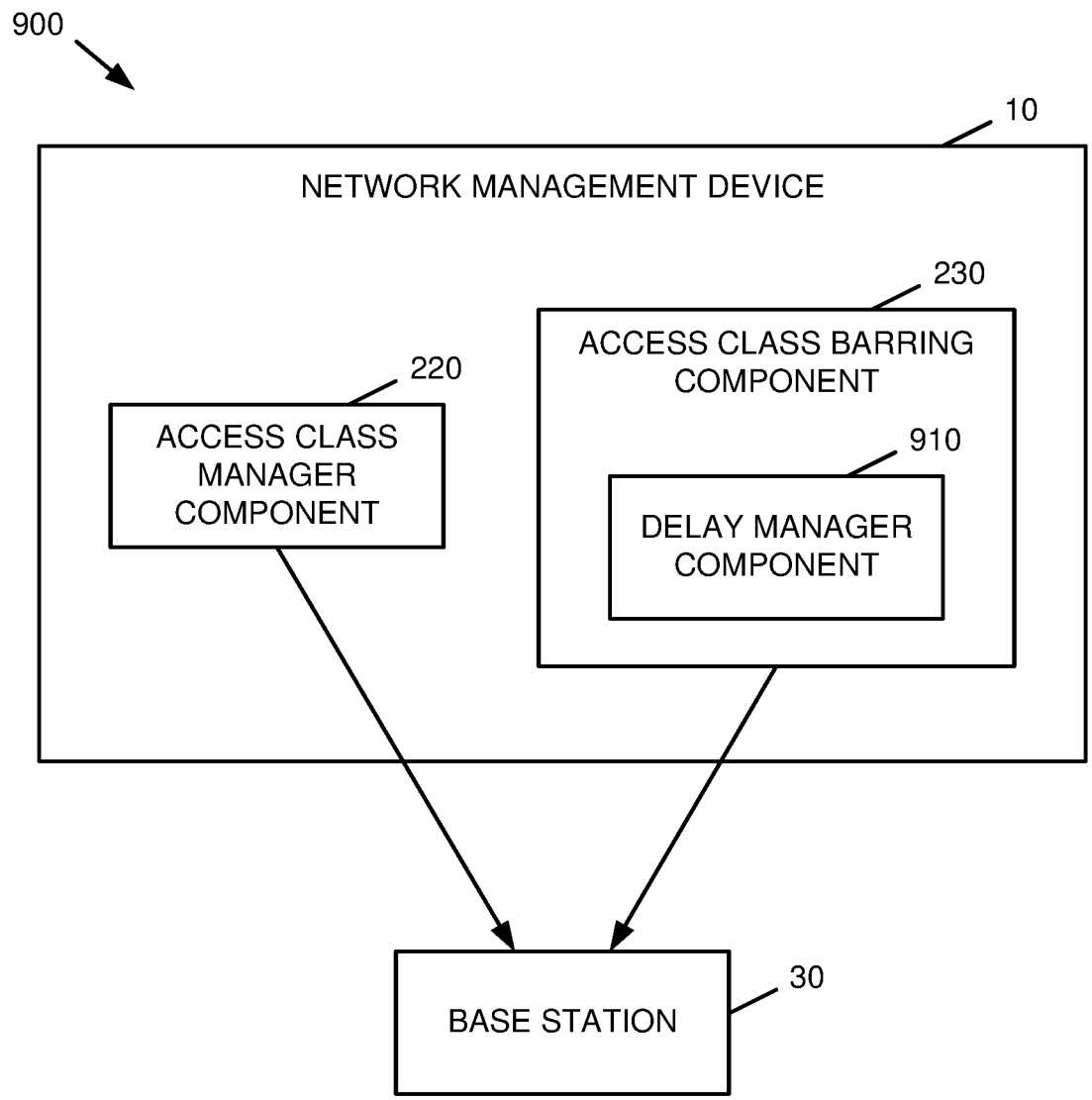
FIG. 9 is a block diagram of a system that facilitates computation and assignment of a time delay in connection with access class barring in accordance with various aspects described herein.

Turning now to FIG. 9, a block diagram of a system 900 that facilitates computation and assignment of a time delay in connection with access class barring in accordance with various aspects described herein is illustrated. Repetitive description of like elements employed in other embodiments described herein is omitted for sake of brevity. As shown in system 900, the access class barring component 230 of the network management device 10 can include a delay manager component 910 that can assign a time delay for ACB operations conducted by an associated base station 30. Stated another way, the delay manager component 910 can instruct the base station 30 to deny respective network access requests that are transmitted by aggressive network equipment 20 to the base station 30 within a determined threshold time of an initial network access request.

In an aspect, a time delay assigned by the delay manager component 910 to a base station 30 can be a uniform delay, or alternatively the time delay can be dynamically set based on the number of aggressive network devices (e.g., network devices assigned a reserved access class designated for aggressive devices as described above) served by the base station and/or based on other factors. Additionally, as described above, the delay manager component 910 can be configured to cause a base station 30 to assign a time delay to respective network equipment that increases with subsequent signaling attempts. As a result, a time delay associated with less aggressive devices, network-controlled devices inherently associated with the reserved access class, etc., will increase more slowly than that associated with highly aggressive devices, thereby applying access barring that is proportional to a given device's aggression toward the network.

Figure 10:
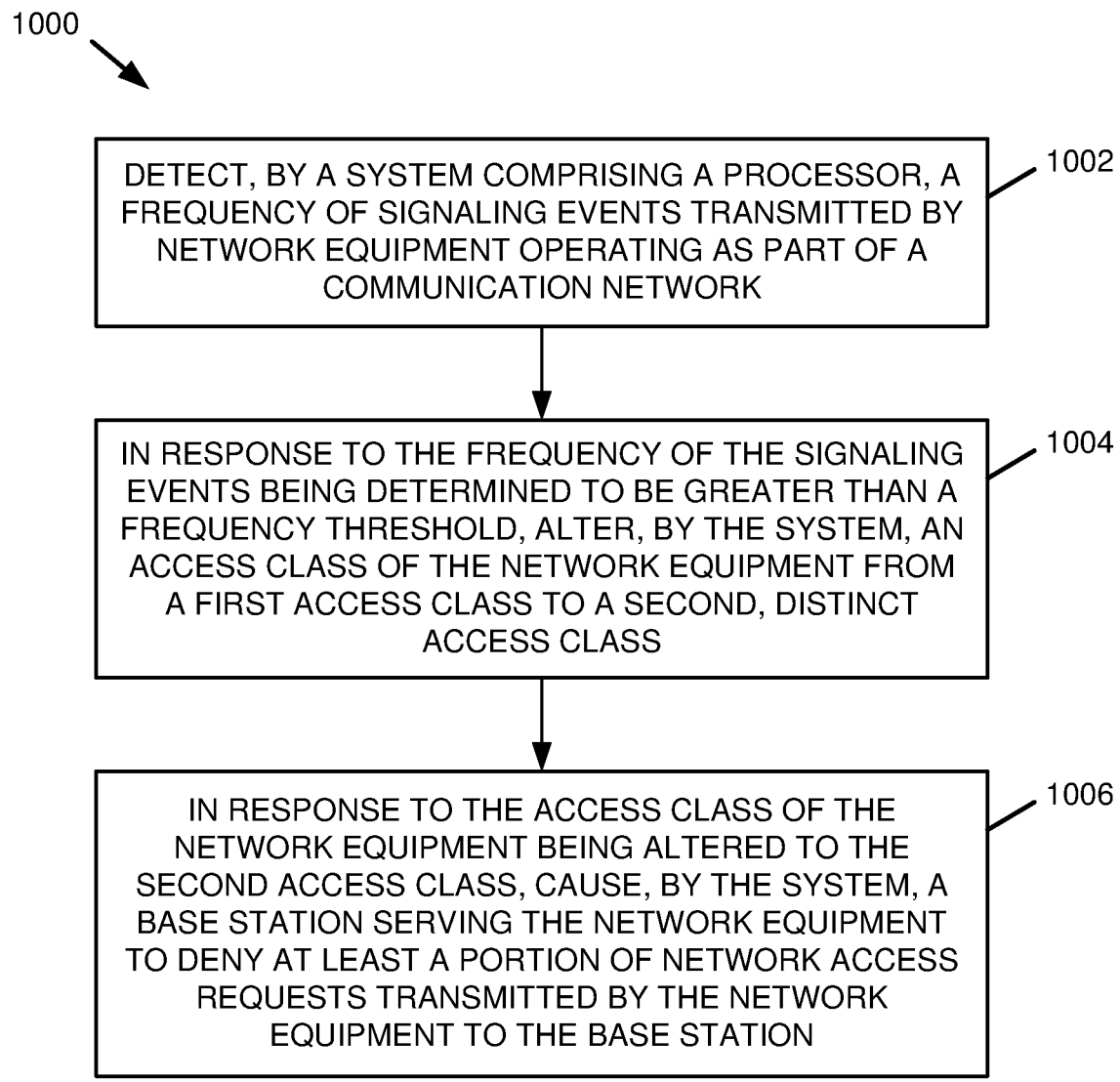
FIG. 10 is a flow diagram of a method that facilitates fine grained access barring of aggressive cellular devices in accordance with various aspects described herein.

FIG. 10 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 10, a flow diagram of a method 1000 that facilitates fine grained access barring of aggressive cellular devices in accordance with various aspects described herein is presented. At 1002, a system comprising a processor (e.g., a network management device 10 comprising a processor 14, and/or a system including such a device) can detect (e.g., by a signaling monitor component 210 and/or other components implemented by the processor 14) a frequency of signaling events transmitted by network equipment (e.g., network equipment 20) operating as part of a communication network.

At 1004, in response to the frequency of the signaling events as detected at 1002 being determined to be greater than a frequency threshold, the system can alter (e.g., by an access class manager component 220 and/or other components implemented by the processor 14) an access class of the network equipment from a first access class (e.g., an access class within a range from 0-9) to a second, distinct access class (e.g., access class 11, and/or another access class reserved by the network for network-controlled devices).

At 1006, in response to the access class of the network equipment being altered to the second access class at 1004, the system can cause (e.g., by an access class barring component 230 and/or other components implemented by the processor 14) a base station serving the network equipment (e.g., a base station 30) to deny at least a portion of network access requests transmitted by the network equipment to the base station.

Figure 11:
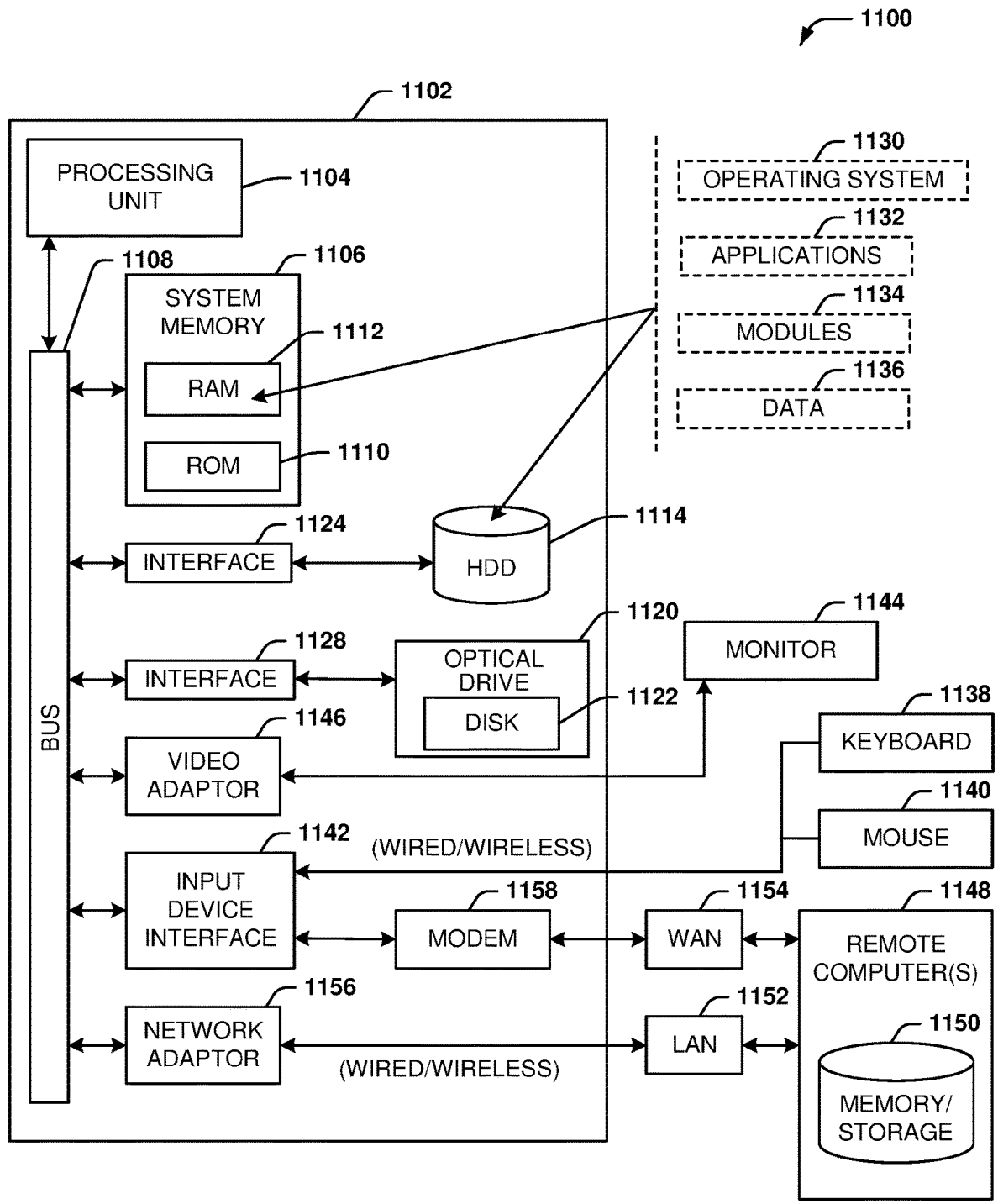
FIG. 11 depicts an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 and an optical disk drive 1120, (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114 and optical disk drive 1120 can be connected to the system bus 1108 by an HDD interface 1124 and an optical drive interface 1128, respectively. The HDD interface 1124 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   detecting, by a system comprising a processor, a frequency of signaling events transmitted by a network device operating as part of a communication network;
   in response to the frequency of the signaling events transmitted by the network device being determined to be greater than a frequency threshold, altering, by the system, an access class of the network device from a first access class to a second access class that is different from the first access class, wherein the second access class is reserved via the communication network;
   in response to the access class of the network device being altered to the second access class, causing, by the system, a base station serving the network device to deny at least a portion of network access requests transmitted by the network device to the base station; and
   in response to the frequency of the signaling events transmitted by the network device being determined to have dropped below the frequency threshold, returning, by the system, the network device to the first access class from the second access class.

2. The method of claim 1, wherein the altering comprises removing the first access class from the network device and assigning the second access class to the network device via an over-the-air message transmitted to the network device.

3. The method of claim 2, wherein the over-the-air message is a first over-the-air message, and wherein
   the returning of the network device to the first access class from the second access class is via a second over-the-air message.

4. The method of claim 3, further comprising:
   in response to altering the network device from the first access class to the second access class, storing, by the system, the first access class of the network device in a repository, wherein returning the network device to the first access class comprises recalling the first access class from the repository.

5. The method of claim 1, further comprising:
   monitoring, by the system, a loading level of the base station serving the network device, wherein the causing is in further response to the loading level of the base station being determined to be above a loading threshold.

6. The method of claim 1, further comprising:
   determining, by the system, pattern data representative of a network usage pattern associated with the base station serving the network device; and
   setting, by the system, the frequency threshold based on the network usage pattern.

7. The method of claim 1, wherein the second access class is reserved for operator-controlled devices via the communication network.

8. The method of claim 1, wherein the instructing comprises, in response to the access class of the network device being altered to the second access class, instructing the base station to deny respective ones of the network access requests that are transmitted by the network device to the base station within a threshold time of a first network access request.

9. The method of claim 8, further comprising:
   assigning, by the system, the threshold time based on a number of network devices served by the base station that are associated with the second access class.

10. A system, comprising:
    a processor; and
    a memory that stores executable instructions that, when executed by the processor, facilitate performance of operations, the operations comprising:
    determining a frequency of signaling events transmitted from a user equipment to a base station in a communication network;
    sending an instruction to change an access class of the user equipment from being associated with a first access class to being associated with a second access class, distinct from the first access class, in response to the frequency of the signaling events received from the user equipment being determined to be greater than a frequency threshold, wherein the second access class is reserved by network equipment in the communication network;
    causing the base station to deny at least a portion of access requests conveyed by the user equipment in response to the user equipment being associated with the second access class; and
    in response to the frequency of the signaling events, received from the user equipment, being determined to have dropped below the frequency threshold, returning the user equipment to the first access class from the second access class.

11. The system of claim 10, wherein sending the instruction to change the access class of the user equipment comprises transmitting a first over-the-air message to the user equipment, the first over-the-air message resulting in the first access class being removed from the user equipment and the second access class being added to the user equipment.

12. The system of claim 11, wherein the returning of the user equipment to the first access class from the second access class comprises:
    transmitting a second over-the-air message to the user equipment, the second over-the-air message resulting in the second access class being removed from the user equipment and the first access class being added to the user equipment.

13. The system of claim 10, wherein causing the base station to deny at least the portion of the access requests comprises causing the base station to deny at least the portion of the access requests conveyed by the user equipment further in response to a loading level of the base station being determined to be greater than a load threshold.

14. The system of claim 10, wherein the second access class is reserved for operator-controlled devices by the network equipment.

15. The system of claim 10, wherein the operations further comprise:
    setting a time threshold for the base station based on a number of devices served by the base station that are associated with the second access class, wherein causing the base station to deny at least the portion of the access requests comprises causing the base station to deny any of the access requests that are conveyed by the user equipment to the base station within less than the time threshold from conveying a first access request of the access requests.

16. A non-transitory machine-readable medium comprising executable instructions that, when executed by a processor, facilitate performance of operations, the operations comprising:
- identifying a signaling frequency associated with a network device served by a base station associated with a communication network;
- replacing a first access class associated with the network device with a second access class that is different from the first access class based on the signaling frequency associated with the network device being greater than a threshold, wherein the second access class is reserved via the communication network;
- causing the base station to deny a network access request transmitted by the network device to the base station based on the network device being associated with the second access class; and
- based on the signaling frequency of the network device falling below the threshold, replacing the second access class associated with the network device with the first access class.

17. The non-transitory machine-readable medium of claim 16, wherein the
- replacing of the first access class associated with the network device with the second access class comprises transmitting a first over-the-air message to the network device.

18. The non-transitory machine-readable medium of claim 17, wherein the
- replacing of the second access class associated with the network device with the first access class comprises transmitting a second over-the-air message to the network device.

19. The non-transitory machine-readable medium of claim 16, wherein the second access class is reserved for operator-controlled devices associated with the communication network.

20. The non-transitory machine-readable medium of claim 16, wherein the operations further comprise:
- based on the network device being associated with the second access class, instructing the base station to deny respective ones of network access requests including the network access request that are transmitted by the network device to the base station within a threshold time of a first network access request.

* * * * *